United States Patent [19]
Burmenko

[11] 4,441,066
[45] Apr. 3, 1984

[54] BATTERY CHARGER FAILURE ALARM CIRCUIT

[75] Inventor: Mark Burmenko, Fairlawn, N.J.

[73] Assignee: McGraw-Edison Company, Rolling Meadows, Ill.

[21] Appl. No.: 425,873

[22] Filed: Sep. 28, 1982

[51] Int. Cl.³ .............................................. H02J 7/04
[52] U.S. Cl. ...................................... 320/48; 320/59
[58] Field of Search ....................... 320/48, 57, 58, 59, 320/60; 322/99

[56] References Cited

U.S. PATENT DOCUMENTS 3,457,491  7/1969  Black et al. ........................... 320/48
3,746,961  7/1973  Dobie .................................... 320/48
4,242,674  12/1980 Wheeler ................................ 320/48

FOREIGN PATENT DOCUMENTS 1432567  4/1976  United Kingdom ................... 320/48

Primary Examiner—William M. Shoop
Assistant Examiner—Anita M. Ault
Attorney, Agent, or Firm—John S. Paniaguas; Jon Carl Gealow; James A. Gabala

[57] ABSTRACT

A battery charger failure alarm circuit for use with a battery charger including a source of rectified AC voltage for charging a battery and a filtering inductor serially interposed between said charger circuit and battery and across which there appears AC ripple voltage so long as the battery charger is functioning properly, includes a sensing circuit coupled to the filtering inductor for sensing the presence of the AC ripple voltage and an alarm circuit coupled to the sensing circuit operable to indicate the failure of the battery charger circuit in response to a lack of sensed AC ripple voltage. A time delay circuit may be included in the battery charger failure alarm circuit between the sensing circuit and alarm circuit to delay the operation of the alarm circuit in the case of momentary loss of the AC ripple voltage.

11 Claims, 1 Drawing Figure

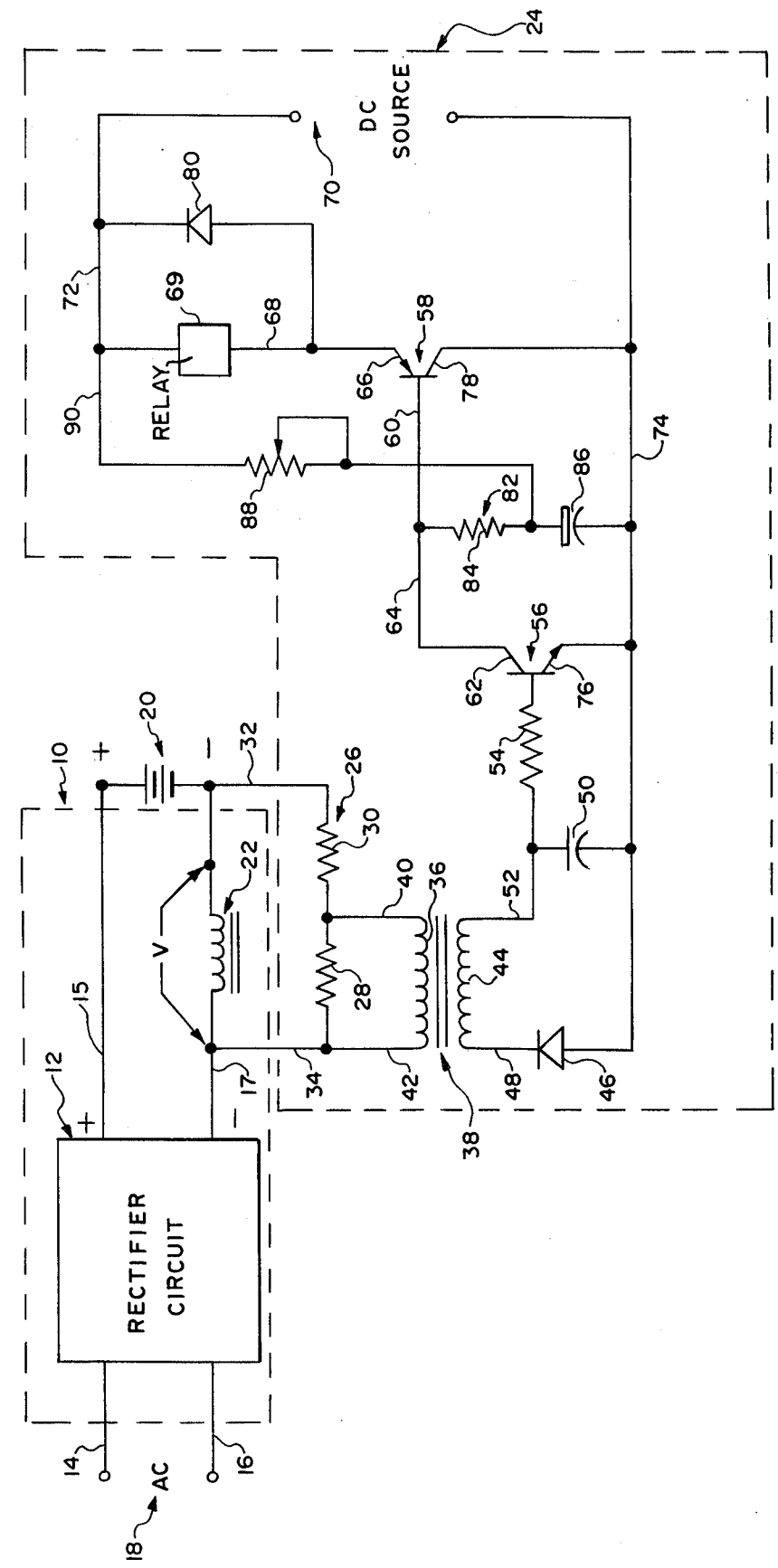

BATTERY CHARGER FAILURE ALARM CIRCUIT

BACKGROUND OF THE INVENTION

This invention relates generally to battery charger circuits and more particularly to auxiliary alarm circuits for indicating a failure of the battery charger circuit.

Many different types of instrumentalities depend upon a battery to supply power thereto. Accordingly, battery charger circuits are normally included to maintain the battery in a charged state. Many such battery charger circuits obtain charging current from an AC source which is rectified to charge the battery. Occasionally, however, a failure occurs and the battery is not charged properly. Such failures can be attributed to a variety of reasons, such as, for example, the loss of input supply voltage, failure of the voltage rectifier used to rectify AC input voltage in the charger circuit, badly corroded battery terminals or the like.

If the battery from which an instrumentality obtains its power becomes discharged because of any of the aforementioned reasons or others, the loss of power in the battery may not be discovered until too late. Accordingly, failure alarm circuits or circuits to indicate that normal charging is occurring, have been added to the battery charger circuits to warn of any interruption in the normal charging of the battery, hopefully in sufficient time to correct the problem without effecting operation of the instrumentality powered by the battery. Examples of such alarm circuits are shown in British Pat. No. 1,432,567 and U.S. Pat. No. 3,746,961.

In certain, presently available battery charger circuits, a filtering inductor is employed to supply virtually pure DC voltage to the battery being charged by the charger circuit. Accordingly, there is available a continued presence of AC ripple voltage across the inductor so long as there is a proper input supply voltage, an operative rectifier and continuity in the circuit including the battery terminals. If the presence or lack of the AC ripple voltage across the inductor included in the battery charger circuit is utilized correctly, it is possible to determined when the charger circuit ceases to function properly.

The field of a series inductor employed in a battery charger circuit has been used to actuate a magnetic switch for the purpose of completing a circuit to a remote battery being charged and to indicate normal charging of the battery, see U.S. Pat. No. 3,457,491, but no suggestion of the use of the AC ripple voltage across the inductor for any purpose including the operation of a failure alarm circuit, is provided in the patent.

SUMMARY OF THE INVENTION

Accordingly, it is a primary object of the present invention to provide in a battery charger circuit including an inductor for filtering rectified AC voltage used for charging a battery, a failure alarm circuit which utilizes the AC ripple voltage across the inductor for operation of the failure alarm circuit.

It is another object of the present invention to provide a failure alarm circuit for a battery charger circuit of the aforementioned type which is efficient in operation and relatively inexpensive to fabricate.

Briefly, a peferred embodiment of the failure alarm circuit according to the invention includes a voltage divider which reduces the voltage across the battery charger filtering inductor and applies it to the primary side of an isolation or coupling transformer. The voltage across the transformer secondary is rectified, filtered and applied to the base of a first transistor. The first transistor is coupled to a second transistor which is maintained normally in a state of conduction. The second transistor drives a relay which when the battery charger circuit fails to charge the battery properly, is operated to produce an alarm or a visual indication of the battery charger failure.

In a preferred embodiment of the failure alarm circuit, a time delay circuit including a RC network and potentiometer, is included to delay the operation of the relay when a failure occurs. The time delay circuit prevents nuisance alarms due to momentary loss of power to the circuit or the like. The potentiometer is used to alter the time delay period, as desired.

DESCRIPTION OF THE INVENTION

The single FIGURE of the drawing illustrates a failure alarm circuit according to the invention coupled to a conventional battery charger circuit including a series connected filtering inductor.

DETAILED DESCRIPTION OF THE INVENTION

Referring now to the single FIGURE of the drawing, there is shown therein a typical battery charger circuit 10 outlined in dashed lines, including a rectifier circuit 12 shown in block diagram form, which is of a conventional design. Rectifier circuit 12 is connected electrically via leads 14, 16 to a source 18 of AC input voltage which when converted to DC by rectifier circuit 12, is used to charge a battery 20 connected to the rectifier circuit by leads 15, 17.

Battery 20 can be of the type employed as a standby power source in a computer system, one which provides field current for a large motor in the event of a power failure, as a secondary power source for railroad crossing gates used also in the event of a power failure or as a source of power for a variety of other applications. Accordingly, it is important that battery 20 be maintained in a fully charged state at all times.

Included in the battery charger circuit 10 is a serially connected inductor 22 used to filter the rectified AC voltage applied to battery 20. Inductor 22 is connected via lead 17 between the negative terminal of battery 20 and the negative output terminal of rectifier circuit 12. During proper operation of the battery charger circuit an AC ripple voltage appears across inductor 22. This phenomenon occurs due to the reluctance of inductor 22. The wave shape of the AC ripple voltage across inductor 22 may vary according to the type of rectifier circuit employed in the battery charger circuit. Rectifier circuit can take the form of a controlled rectifier, a switching type rectifier or the like.

Regardless of the type of rectifier circuit employed or the value of the voltage across inductor 22, so long as the battery charger circuit is functioning properly, there will be an AC ripple voltage appearing across inductor 22.

The AC ripple voltage across inductor 22 is sensed by battery charger failure alarm circuit 24 according to the invention, also illustrated in the drawing FIGURE by dashed lines. The battery charger failure alarm circuit provides indication by means of a sensory perceptive signal, such as an audible bell and/or visual light, of a failure of the battery charging circuit. Such failures can occur for a variety of reasons, including for example, loss of input supply power, rectifier circuit failure, loss of circuit continuity including corroded or faulty battery terminals or the like.

Battery charger failure alarm circuit 24 according to the invention includes a voltage divider network 26 comprising resistors 28, 30, connected via leads 32, 34 across filtering inductor 22. Voltage divider network 26 reduces the voltage across inductor 22 for application to the primary winding 36 of an isolation transformer 38, also included in circuit 26 and connected across resistor 28 via leads 40, 42. The voltage across primary winding 36 of isolation transformer 38 appears across secondary winding 44 of the transformer and is thereafter rectified by diode 46 connected in series therewith at lead 48. The rectifier voltage is filtered by a capacitor 50 connected across leads 74, 52. The resulting DC voltage is applied through a resistor 54 to the base of a first transistor 56 for biasing the transistor to a state of conduction or "on" condition.

Operation of transistor 56 in turn biases a second transistor 58, joined at its base 60 to the collector 62 of transistor 56 via lead 64, to a state of conduction or "on" condition. Transistor 58 in turn functions as a relay driver to operate a relay 69 (only the coil being depicted in the drawings) coupled to the emitter 66 of transistor 58 via lead 68, which relay controls an audible or visual indicator to show that a failure has occurred in the battery charger circuit. The contacts (not shown) of relay 69 are held open by the operation of transistor 58 to prevent the audible and/or visual alarm from functioning so long as the AC ripple voltage appears across inductor 22 of the battery charger circuit.

A DC source 70 connected between leads 72, 74, provides power for the failure alarm circuit 24. The emitter 76 of transistor 56 and collector 78 of transistor 58 are connected to leads 74 and the negative side of the DC power source. A freewheeling diode 80 is connected in parallel relation with relay 69.

Also included in the preferred embodiment of the failure alarm circuit 24, but which is not necessary to the operation of the circuit, is a time delay circuit 82. Time delay circuit 82 includes a RC network comprising resistance of relay 64, emitter-base resistance of transistor 58, resistor 84, potentiometer 88 and capacitor 86, coupled across the collector-emitter leads of transistor 56. In the time delay circuit shown, a potentiometer 88 is connected via lead 90 between positive terminal of DC source 70 and a point between the resistor 84 and capacitor 86 of the RC network. Potentiometer 88 permits selection of a time delay period. The purpose of the time delay network is to delay predeterminedly, the time between which a failure occurs in the battery charger circuit and the time at which the failure alarm is signaled. Through the provision of the time delay circuit, a failure alarm which is produced by a momentary loss of AC power or the like, can be prevented.

In operation, so long as a voltage appears across inductor 22 included in the battery charger circuit, transistors 56, 58, are operated to an "on" condition. The operation of transistor 58 operates relay 69 to hold open contacts thereof (not shown) which maintain an alarm, in the "off" condition. As mentioned heretofore, the alarm may take the form of an audible alarm such as, for example, a bell, buzzer or the like, a visual alarm such as, for example, a light, or other sensory perceptive signal.

If, for some reason, the battery charger circuit should fail, voltage will not be present across the filtering inductor 22. Accordingly, transistors 56, 58 will be operated to a non-conducting state or an "off" condition and relay 69 will be dropped out, permitting its contacts (not shown) to close and operate the alarm.

As explained heretofore, to avoid nuisance failure alarms, time delay circuit 82 has been incorporated into a preferred embodiment of the failure alarm circuit 24 of the invention. The time delay period is controlled by potentiometer 88. In the event a momentary loss of power in the battery charger circuit occurs and the voltage across inductor 22 is therefore momentarily lost, time delay circuit 82 will delay the operation of relay 64 predeterminedly to operate the alarm.

In the case of the time delay circuit 82 shown in the drawing, when potentiometer 88 is set to a zero resistance setting, the time delay period also becomes zero. Increasing the value of the resistance of potentiometer 88 in turn increases the time delay period.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a battery charger circuit including a source of rectified A.C. voltage coupled for charging a battery connected to said circuit and inductor means, serially connected between said source of rectified A.C. voltage and said battery, for filtering the rectified A.C. voltage prior to application of said battery, A.C. voltage being present across said inductor so long as said battery charger circuit is functioning to charge said battery, a battery charger failure alarm circuit including in combination:

voltage divider means, electrically coupled to said inductor means, for dividing the voltage drop across said inductor means into at least two voltages including a first voltage;

isolation transformer means, electrically coupled to said voltage divider means, for transforming said first voltage into a second voltage;

rectifier means, electrically coupled to said isolation transformer means, for rectifying said second voltage;

a first transistor, said rectified second voltage being applied to the base of said first transistor for switching said transistor means to a conducting state;

a second transistor, the base of which is electrically coupled to said first transistor, said second transistor being switched from a non-conducting state to a conducting state in response to said first transistor being switched to a conducting state; and alarm means, operating in response to said second transistor, for producing a sensory perceptive signal in the event that said first and second transistors are switched to a non-conducting state in response to the absence of A.C. voltage across said inductor means.

2. A battery charger failure alarm circuit as claimed in claim 1, further including time delay circuit means, coupled between said first and second transistors, for predeterminedly delaying the switching of said second transistor to said non-conducting state, whereby said alarm means operates in response to the sustained loss of said AC voltage across said inductor means.

3. A battery charger failure alarm circuit as claimed in claim 2, wherein said time delay circuit means further includes RC circuit means for varying the time delay period of said alarm means.

4. A battery charger circuit as claimed in claim 1, wherein said first transistor is an NPN transistor.

5. A battery charger circuit as claimed in claim 1, wherein said second transistor is a PNP transistor.

6. A battery charger circuit as claimed in claim 1, wherein said alarm means includes a relay comprising a coil and a set of contacts which are operated by the coil, said coil being energized in response to said second transistor, said conacts being normally closed and being adapted to be connected to a series circuit including a power supply and an alarm bell, whereby in the event that said relay coil becomes de-energized, said bell is energized.

7. A battery charger circuit as claimed in claim 1, wherein said alarm means is a light which glows in the event that said second transistor is switched to a conducting state, whereby said light ceases to glow in the event of the absence of said AC voltage across said inductor means.

8. A battery charger failure alarm circuit for use with a battery charger circuit comprising a source of rectified AC voltage coupled to a battery for charging said battery and a filtering inductor interposed between said source of charging voltage and said battery, AC voltage being present across said inductor so long as said battery charger circuit is functioning properly to charge said battery, said battery charger failure alarm circuit including in combination:

(a) a transformer;
(b) a rectifier, said transformer coupling said AC voltage to said rectifier;
(c) a transistor switch coupled to said rectifier, said transistor being selectively biased in accordance with the application of rectified, sensed AC voltage thereto; and
(d) alarm means, operated in response to said transistor switch, for signaling the absence of said AC voltage across said inductor.

9. A battery charger failure alarm circuit as claimed in claim 8, further including voltage divider means, interposed between said filtering inductor and said transformer, for reducing the level of said AC voltage present across said filtering inductor prior to the application thereof to said rectifier.

10. A battery charger failure alarm circuit as claimed in claim 9, wherein said transistor switch includes time delay means for predeterminedly delaying the operation of said alarm means.

11. A battery charger failure alarm circuit as claimed in claim 10, wherein said time delay means includes an RC network circuit and a potentiometer for controlling the RC time constant of said RC network.

* * * * *